US 8,347,359 B2

(12) United States Patent
Backa

(10) Patent No.: US 8,347,359 B2
(45) Date of Patent: Jan. 1, 2013

(54) ENCRYPTION SENTINEL SYSTEM AND METHOD

(76) Inventor: Bruce Backa, Incline Village, NV (US)

(*) Notice: Subject to any disclaimer, the term of this patent is extended or adjusted under 35 U.S.C. 154(b) by 725 days.

(21) Appl. No.: 12/342,929

(22) Filed: Dec. 23, 2008

(65) Prior Publication Data

US 2009/0172786 A1 Jul. 2, 2009

Related U.S. Application Data

(60) Provisional application No. 61/017,307, filed on Dec. 28, 2007, provisional application No. 61/030,314, filed on Feb. 21, 2008.

(51) Int. Cl.
*G06F 21/00* (2006.01)
(52) U.S. Cl. ............ 726/4; 713/165; 713/166; 713/168; 709/217; 709/229; 370/248; 370/413; 726/3
(58) Field of Classification Search .................. 726/4
See application file for complete search history.

(56) References Cited

U.S. PATENT DOCUMENTS

| | | | | |
|---|---|---|---|---|
| 5,828,832 A * | 10/1998 | Holden et al. | ............... | 726/12 |
| 6,351,817 B1 * | 2/2002 | Flyntz | .................. | 726/4 |
| 6,389,543 B1 * | 5/2002 | Dawson et al. | ............. | 726/4 |
| 6,434,699 B1 * | 8/2002 | Jones et al. | ............. | 713/168 |
| 6,968,345 B1 * | 11/2005 | Muhlestein | ............. | 707/824 |
| 7,287,063 B2 * | 10/2007 | Baldwin et al. | ............. | 709/216 |
| 7,346,922 B2 * | 3/2008 | Miliefsky | ............. | 726/3 |
| 7,360,095 B2 * | 4/2008 | Girouard et al. | ............. | 713/182 |
| 7,430,593 B2 * | 9/2008 | Baldwin et al. | ............. | 709/223 |
| 7,506,040 B1 * | 3/2009 | Rabe et al. | ............. | 709/223 |
| 7,603,553 B1 * | 10/2009 | Corbett et al. | ............. | 713/165 |
| 7,752,205 B2 * | 7/2010 | McVeigh et al. | ............. | 707/736 |
| 8,046,378 B1 * | 10/2011 | Zhuge et al. | ............. | 707/783 |
| 2002/0147920 A1 * | 10/2002 | Mauro | ............. | 713/200 |
| 2004/0143608 A1 * | 7/2004 | Nakano et al. | ............. | 707/204 |
| 2005/0050363 A1 * | 3/2005 | Naka et al. | ............. | 713/201 |
| 2005/0203910 A1 * | 9/2005 | Taguchi et al. | ............. | 707/10 |

(Continued)

OTHER PUBLICATIONS

Sentinel Computer Security System|http://www.google.com/url?sa=t&rct=j&q=&esrc=s&frm=1&source=web&cd=16&cad=rja&ved=0CDoQFjAFOAo&url=http%3A%2F%2Fwww.securedprocessing.com%2Fproducts%2Fdownloads%2Fsentinel_white_paper.docx&ei=644-UPDRCYT-6wG68ICYAg&usg=AFQjCNEuA4n58Te8vev4zfrb8gWvNrHgJw&sig2=C73t5almWkH4_4RKf6tCaQ|Secure Processing Inc.|.*

*Primary Examiner* — David Pearson
*Assistant Examiner* — Mahfuzur Rahman
(74) *Attorney, Agent, or Firm* — Sampson & Associates, P.C.

(57) ABSTRACT

An encryption sentinel system and method protects sensitive data stored on a storage device and includes sentinel software that runs on a client machine, sentinel software that runs on a server machine, and a data storage device. When a client machine requests sensitive data from the data storage device, the data storage device interrogates the sentinel software on the server machine to determine if this client machine has previously been deemed to have proper encryption procedures and authentication. If the sentinel server software has this information stored, it provides an approval or denial to the storage device that releases the data if appropriate. If the sentinel server software does not have this information at hand or the previous information is too old, the sentinel server interrogates the sentinel software that resides on the client machine which scans the client machine and provides an encryption update to the sentinel server software, following which data will be released if appropriate.

10 Claims, 1 Drawing Sheet

U.S. PATENT DOCUMENTS

| | | | |
|---|---|---|---|
| 2005/0251522 A1* | 11/2005 | Clark | 707/100 |
| 2006/0069665 A1* | 3/2006 | Yamakawa et al. | 707/1 |
| 2007/0094711 A1* | 4/2007 | Corley et al. | 726/3 |
| 2007/0204331 A1* | 8/2007 | O'Brien | 726/4 |
| 2008/0120699 A1* | 5/2008 | Spear | 726/4 |
| 2009/0037732 A1* | 2/2009 | Boccon-Gibod et al. | 713/168 |

* cited by examiner

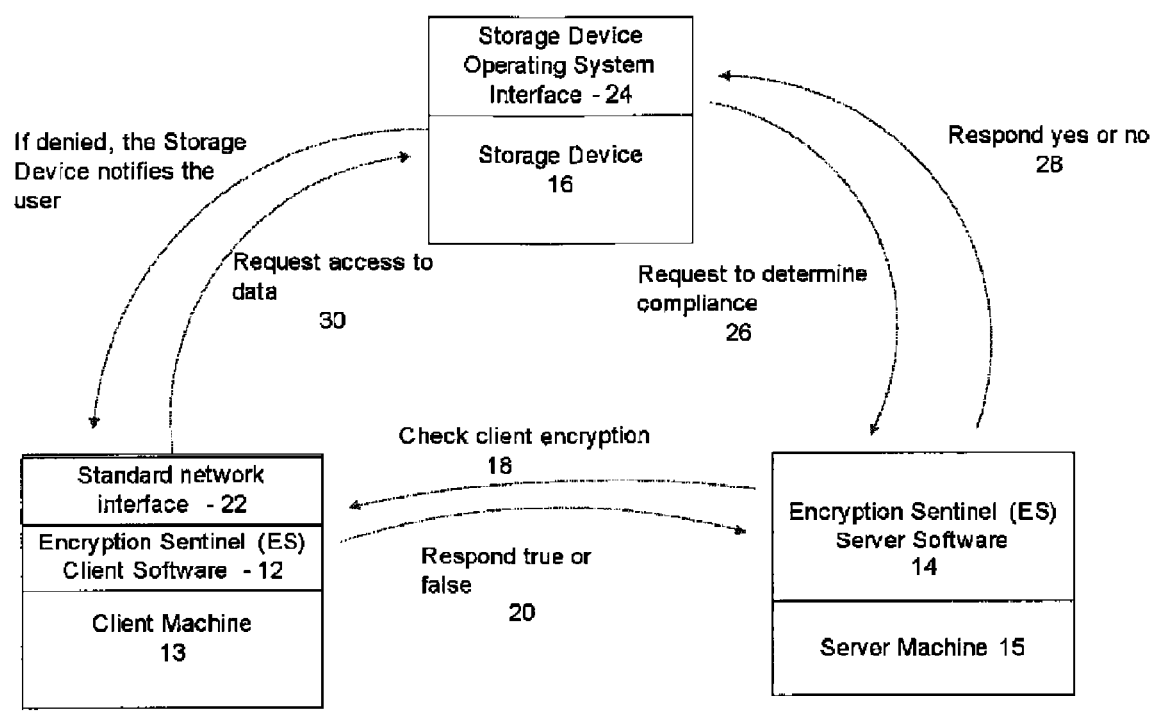

ENCRYPTION SENTINEL SYSTEM AND METHOD

CROSS REFERENCE TO RELATED APPLICATIONS

This application claims priority to U.S. Patent Application Nos. 61/017,307 filed on Dec. 28, 2007 entitled "Encryption Sentinel System and Method" and 61/030,314 filed on Feb. 21, 2008 entitled "Encryption Sentinel System and Method", both of which are incorporated fully herein by reference.

TECHNICAL FIELD

The present invention relates to access to and the movement of sensitive data and more particularly, relates to a system and method for determining whether or not a client is requesting access to data deemed sensitive and perhaps encrypted and if so, making sure that the client computer will maintain the integrity of the data, such as by encryption, obtained from a storage device where that data has been deemed sensitive.

BACKGROUND INFORMATION

Many host computers today store very sensitive data. Although the owner or manager of the data can usually control the dissemination of the data while on the host computer, the task becomes more difficult as the data is disseminated to those individuals who need to use the data in the field.

What often times happens is that a legitimate user (sometimes referred to as a "client") of the data will request the data from the host computer. A "user" can be a human being or an application program, running on another computer, that needs to access and use the sensitive data. The host will transfer the data to the user's computer or other device to enable the user to utilize the data. Although the data may be secured and perhaps encrypted on the host and also encrypted during transmission from the host to the user's device, once the data is on the user's device, the data is susceptible to being lost, stolen or otherwise misappropriated. For example, a user may download the data to a file or directory which has no security or encryption attached to it. When the user's device is connected to the Internet, for example, others may view, copy or otherwise misappropriate such data.

Accordingly, what is needed is a system and method for ensuring that a user or client receiving sensitive data has all of the necessary encryption and/or security features desired by the data manager or data owner for protecting the integrity of such secure data once it is on the client computer or device.

BRIEF DESCRIPTION OF THE DRAWINGS

These and other features and advantages of the present invention will be better understood by reading the following detailed description, taken together with the drawings wherein:

FIG. 1 is a block diagram of a system implementing the present invention.

DETAILED DESCRIPTION OF THE PREFERRED EMBODIMENTS

The present invention will be explained in connection with FIG. 1 using the following defined terms wherein: storage device means a device designed to host storage. One such example would be a "Network Area Storage" (NAS) filer running ONTAP® or equivalent operating system. ONTAP® is an operating system available from NetApp, Inc. of Sunnyvale Calif.

The present invention is preferably implemented as a software product that is designed to prevent unencrypted network client machines or users from reading sensitive data on storage devices that is meant to be encrypted or otherwise protected on the client machine. The invention is designed to prevent honest users from making honest mistakes. It is not designed to thwart malicious or deliberate users.

There are five components to a system 10 on which may be implemented the present invention, namely: a client machine 13, a server machine 15, a storage device 16, Encryption Sentinel (ES) client software 12, and Encryption Sentinel (ES) server software 14. These components are implemented as a combination of computer hardware and/or software as those skilled in the art will know and understand. The ES client software application portion 12 of the invention 10 is designed or accommodated to operate on all desktops/laptops or other user devices requiring access to stored data such as PDA's, cell phones, etc. It is responsible for determining whether the local, client fixed disks or storage devices are encrypted or not. It is also responsible for relaying this information to the ES server software 14.

The ES server software component 14 is designed to run on a server machine 15 using Windows or other operating system that has access to the storage device 16 which holds or stores sensitive data that may or may not be encrypted on the storage device 16. The ES server software component 14 is responsible for: determining when a client machine 13 is trying to access sensitive data on a storage device 16, checking the request by the client against policies (encryption sentinel or ES policies) established by the system administrator; contacting the ES client software component 12 running on the client machine 13; and then allowing or denying the client machine's data access request based on the established policies and the state of the client machine's encryption status.

The ES software client component 12 will run as a Windows or similar service on all client machines 13 that need to access sensitive data that may or may not be encrypted, residing on a connected and "protected" storage device 16. Windows native encryption, as well as any other data encryption techniques, are contemplated by the present invention.

At startup, the invention must determine the client machine's "encryption state" as quickly as possible. A machine is considered encrypted if the directories, as configured by the system administrator on all local, fixed disks or other storage device(s), are encrypted. Windows allows the client to enable/disable encryption on any file or directory individually so the encryption state of every directory will need to be determined. For example, a system administrator may configure an ES policy such that if any directory on the client machine 13 is not encrypted, the client and client machine or device 13 is considered unsafe and will not be allowed to access data deemed sensitive on the storage device 16. Another example would be that a system administrator may configure an ES policy such that not all client directories or files will need to be encrypted to receive data deemed sensitive on the storage device 16. Thus, what directories need be considered for encryption status is at the discretion of the system administrator, which would be the person configuring the policies using the ES server software.

"Walking" or scanning the client machine 13 file system may take too long to execute to determine the encryption state in real-time. Accordingly, the current state of the client machine 13 may be determined by the ES client software 12 when this software starts up (which is when the client machine 13 starts up) and cached. The encryption status will be determined by ES client software 12 automatically, rescanning the local file system on the client machine 13 once every certain number of hours (for example, every 8 hours) and which time is programmable by the system administrator, or as deemed necessary by some other system process, to determine whether or not the requisite encryption is being maintained on the client machine 13. Entries other than actual time entries in the cache may also be used as a signal to the ES client or Server software concerning the status of the encryption state of the client machine or device 13. For example, a time entry of zero indicates no cache-check every time. Also the system administrator can configure the ES client software 12 to lock the state of encryption, which disables the ability of the client machine user to make any changes to the encryption state on the client machine 13. If the encryption state of a machine cannot be determined, it will be considered unencrypted. During the startup process when the client machine 13 is being scanned for the first time, it is considered unencrypted.

The ES server software 14 will communicate with and to the ES client software component 12 through a standard network interface 22 (for example a Windows Socket). The ES server software 14 will send a single command 18 to the ES client software 12 to retrieve the client's encryption status, which was determined previously by automatic scans by the ES client software 12, as scheduled by the system administrator, and saved in a cache on the client machine 13. If the ES server software 14 cannot communicate with the ES client software 12 on a client machine 13, it will assume that the client machine 13 is unencrypted and no sensitive data will be allowed to be accessed. Communication to and between the ES client software 12 on a client machine 13 will itself be encrypted as discussed below.

The ES client software 12 on a client machine 13 will "listen" via a standard network interface (for example Windows Socket) 22 for requests from the ES server software 14. The ES client software 12 must respond to this command with a simple true or false 20. True indicates the client is encrypted, false indicates it is not. The status of encryption will be determined by the ES client software 12 by one of two methods, depending on the implementation by the system administrator. One method will entail the ES client software 12 scanning all user accessible directories on the client machine 13 and determining if they are all encrypted. If they are, the status of the client machine will be considered encrypted ("true" response) by the ES client software 12. If they are not all encrypted, the status will be considered not encrypted ("false" response) by the ES client software 12.

A second method is that when a system administrator configures an Encryption Sentinel policy via the ES server software 14, the system administrator will designate which directories will need to be encrypted on the client machine 13 in order for the machine to be considered encrypted by the ES client software 12 ("true" response).

Communication with the ES server software 14 must be performed safely and reliably. The standard Windows encryption APIs or equivalent may be used to encrypt the messages between the ES client software 12 on a client machine 13 and the ES server software 14 on the server machine 15. Fixed or rolling key encryption mechanisms are contemplated as well as any and all other encryption methods. To ensure security, the ES server software 14 may use an industry standard "challenge-response" method (such as Kerberos or equivalent) when communicating with the ES client software 12 to verify its authenticity.

The ES server software component 14 will typically run as a Windows service on the server machine 15. The ES server software component 14 will execute on a machine running Windows 2000 Server, Windows 2003 server or equivalent. The service account (i.e. user ID) that the ES server software 14 runs under must have administrative privileges on the storage device 16 which contains the data to be accessed by the client machine 13. The ES server software 14 allows the user, (typically the system administrator), to configure which directories/volumes on the storage device 16 are to be considered for enforcement of the ES policies such that a client machine 13 accessing this data on the storage device 16 must be considered encrypted, as determined by the ES client software 12 scans.

The ES server software 14 will control access to files on the storage device 16 through the storage device operating system interface 24 on the storage device 16. One example of this is the Fpolicy interface designed by NetApp, Inc. for controlling access to files stored on their NAS devices running the ONTAP® operating system. The ES server software component 14 will go through a registration process with the storage device operating system interface 24. This registration process notifies the storage device operating system interface that the ES server software 14 needs to be made aware of any attempts to open or create a file. Once registered, the storage device 16 will notify the ES server software component 14 each time a client machine 13 attempts to open or create a file on the storage device 16. The ES server software 14 component must determine whether the client should be allowed access to the file or not and respond appropriately 28 to the storage device 16.

The storage device operating system interface 24 provides the mechanism for the ES server software component 14 to allow or deny client machine 13 access to a file based on the client machine's encryption status.

The ES server software 14 will maintain a cache of certain client IP addresses and their encryption status. When a client machine 13 attempts to access a file, the ES server software 14 will look in its cache first. If the client's IP address is not in the cache, or the cached value has been in the cache for more than a predetermined length of time, the ES server software 14 will send a command 18 to the ES client software 12 to request the current encryption status of the client machine 13. The response 20 will be stored in the cache of the ES server software 14 along with a current date and time stamp.

If the ES server software 14 is unable to make a connection to the client machine 13, it will assume the ES client software 12 is not running on the client machine 13. The ES server software 14 will also assume the client machine 12 is unencrypted, but it will not store this result in the cache.

Operation of an exemplary embodiment of the invention is as follows: Once ES policies have been established by a system administrator on the ES server software 14, upon ES server software 14 startup, the ES server software 14 registers with one or more storage device(s) 16 and then waits for a client machine 13 to issue a request 30 to a "protected" storage device 16 indicating that a client machine 13 is attempting to access a file on the storage device 16. Once installed on the client machine 13, the ES client software component 12 starts up automatically when the client machine 13 starts up (boots up), determines the client machine's 13 encryption state, and waits for a request 18 from the ES server software 14 for its encryption state. Next, a user attempts to open a file from his client machine 13 that resides on a storage device 16 managed by the ES server software 14 of present invention.

The storage device 16 then sends a request 26 to the ES server software component 14 asking whether the client machine 13 should be allowed to open the file. The ES server software 14 looks in its local cache for the encryption state of the client machine 13. If the client machine 13 is not in the cache or the cached value is older than a certain length of time, for example 4 hours, the ES server software 14 sends an encrypted message 18 to the ES client software component 12 running on the client machine 13 attempting to access the file, requesting the encryption status of the client machine 13. The ES client software 12 responds to the ES server software 14 with a true or false value 20.

The ES server software 14 then makes a reply call 28 back to the storage device 16 indicating whether the client machine 13 can access the file or not. Based on the reply 28 from the ES server software 14 to the storage device 16, the storage device 16 will allow or not allow access to the requested data by the client machine 13.

Accordingly, the present invention provides a novel system and method for ensuring that sensitive data on a storage device will move only to a secure, encrypted user device in accordance with the policies set by the system administrator, thereby minimizing the threat of sensitive data being moved to a non-secure, non-encrypted user device.

Modifications and substitutions by one of ordinary skill in the art are considered to be within the scope of the present invention, which is not to be limited except by the allowed claims and their legal equivalent.

What is claimed is:

1. A system for controlling access to sensitive data, said system comprising:
   a data storage device, configured for storing data and including a data storage controller, responsive to a request to access data from a client access device, for providing a request indication of said request to access data, and for providing said data only upon receiving an authorization indication from a data access control server that said client access device is authorized to access said data;
   the data access control server, coupled to said data storage device and to said client access device and including an encryption sentinel server, said encryption sentinel server responsive to said request indication from said data storage device, and responsive to a security indication of whether said client access device is secure, for controlling access to said data on said data storage device by said client access device;
   the client access device, coupled to said data storage device and to said data access control server and including a client data access controller, configured for initiating said request to access data, and responsive to said encryption sentinel server, for providing the security indication with secure status of a storage device on said client access device; and
   wherein said encryption sentinel server is configured to store the secure status of said client access device, including a timestamp of said status, on said data access server.

2. The system of claim 1, wherein said data stored on said data storage device is deemed to be sensitive data by a system administrator.

3. The system of claim 1, wherein said data stored on said data storage device is encrypted.

4. The system of claim 1, wherein said data access control server is configured for checking the secure status of said client access device.

5. A method for controlling access to sensitive data using the system of claim 1, comprising the acts of:
   receiving, by said data storage device, a request from said client access device for access to sensitive data stored on said data storage device;
   in response to said received request, said data storage device issuing a request to said data access control server to inquire whether said client access device is authorized to receive the requested sensitive data;
   in response to said issued request by said data storage device, said data access control server determining whether said client access device is secure, and providing an indication of said secure status of said client access device to said data storage device in response to said issued request; and
   responsive to said provided indication of the secure status of said client access device provided by said data access control server, said data storage device providing said requested sensitive data to said client access device if said indication of the secure status of said client access device is positive or otherwise providing a sensitive data access denial response to said client access device.

6. The method of claim 5, wherein said act of determining whether said client access device is secure by said data access control server includes the act of searching said data access control server for an indicator of whether said client access device is secure or not secure, and for providing said indication based on said search.

7. The method of claim 5, wherein said act of determining whether said client access device is secure by said data access control server includes the act of querying said client access device for an indicator from said client access device of whether or not it is secure, and receiving from said client access device the indicator of whether or not it is secure.

8. Method of claim 7, further including after the act of receiving from said client access device the indicator of whether or not it is secure, the further act of storing said indicator on said data access control server.

9. The method of claim 8, wherein said stored indicator of the secure status of said client access device includes timestamp indicating when said secure status was received.

10. The method of claim 9, wherein said act of determining whether said client access device is secure by said data access control server includes the act of searching said data access control server for said indicator, and if said indicator is stored on said data access control server, further including the act of reviewing said timestamp indicating when said secure status was received and if said timestamp is less than or equal to a predetermined amount of time from the current time, providing said indication indicating that said client access device is secure, and if said timestamp is greater than a predetermined amount of time from the current time, providing said indication indicating that said client access device is not secure.

* * * * *

UNITED STATES PATENT AND TRADEMARK OFFICE
CERTIFICATE OF CORRECTION

PATENT NO. : 8,347,359 B2  Page 1 of 1
APPLICATION NO. : 12/342929
DATED : January 1, 2013
INVENTOR(S) : Bruce Backa It is certified that error appears in the above-identified patent and that said Letters Patent is hereby corrected as shown below:

In the Claims

Column 5, Line 59, before the word 'server' insert the word -- control --.

Column 6, Line 48, after the word 'includes' insert the word -- the --.

Signed and Sealed this
Twenty-fourth Day of December, 2013

Margaret A. Focarino
*Commissioner for Patents of the United States Patent and Trademark Office*